United States Patent [19]

Di Aragona

[11] Patent Number: 4,671,137
[45] Date of Patent: Jun. 9, 1987

[54] DRIVE DEVICE OF VARIABLE TRANSMISSION RATIO, PARTICULARLY FOR OPERATING AN INTERNAL COMBUSTION ENGINE SUPERCHARGER

[75] Inventor: Antonio B. Di Aragona, Moncalieri, Italy

[73] Assignee: Fiat Auto S.p.A., Turin, Italy

[21] Appl. No.: 751,054

[22] Filed: Jul. 2, 1985

[30] Foreign Application Priority Data

Jul. 6, 1984 [IT] Italy ............................... 67689 A/84

[51] Int. Cl.$^4$ .......................... F16H 3/44; F16D 31/04
[52] U.S. Cl. ........................................ 74/794; 74/774;
192/61
[58] Field of Search ............... 74/793, 794, 752 C,
74/773, 774, 781 R, 782, 783, 863, 853; 418/58,
61 R; 192/61, 85 F, 103 FA

[56] References Cited

U.S. PATENT DOCUMENTS

| 908,365 | 12/1908 | Ward | 418/58 |
| 2,454,694 | 11/1948 | Grebb | 74/794 |
| 2,652,911 | 9/1953 | Somers | 74/794 |
| 2,921,483 | 1/1960 | Colmerauer | 74/774 |
| 3,025,877 | 3/1962 | Buckay | 74/752 C |
| 3,099,926 | 8/1963 | Thorpe | 74/774 |
| 3,380,320 | 4/1968 | Zierick | 74/794 |
| 3,404,584 | 10/1968 | Trautmann | 74/687 |
| 3,625,322 | 12/1971 | Nagamatsu | 74/752 C |
| 3,741,040 | 6/1973 | Shaw | 74/794 |
| 4,322,988 | 4/1982 | Hill | 74/773 |

FOREIGN PATENT DOCUMENTS 0699229 11/1979 U.S.S.R. ........................... 418/61 R

Primary Examiner—Allan D. Herrmann
Assistant Examiner—David Novais
Attorney, Agent, or Firm—Pearne, Gordon, McCoy & Granger

[57] ABSTRACT

The drive device consists of a rotating casing containing a fluid and carrying internally in an idle manner a sun gear and a pair of respective planet gears which mesh with the sun gear and define a gear pump therewith; the fluid is contained in an inner reservoir of the casing, and this latter is provided, in correspondence with the meshing zones between the planet gears and sun gear, with respective intake chambers connected to the reservoir and with delivery chambers closed by automatic valves which are kept closed by the preloading of a spring against a ball and arranged to open at a predetermined pressure in order to connect the delivery chambers to the reservoir. A pneumatic device also controls a respective shut-off valve in order to connect the delivery chambers to the reservoir independently of the opening of the automatic valves.

6 Claims, 2 Drawing Figures

DRIVE DEVICE OF VARIABLE TRANSMISSION RATIO, PARTICULARLY FOR OPERATING AN INTERNAL COMBUSTION ENGINE SUPERCHARGER

BACKGROUND OF THE INVENTION

This invention relates to a drive device of variable transmission ratio, particularly suitable for operating a supercharger or other accessory of a vehicle internal combustion engine.

In the vehicle field, an obstacle to the use of internal combustion engines supercharged by means of positive displacement blower driven directly by the engine instead of by the vehicle exhaust gas is the need to use a practically stepless speed-change gear for transmitting motion from the drive shaft to the blower operating shaft. This is because as the rotational speed of the drive shaft increases the rotational speed of the blower operating shaft has to be limited both in order not to subtract too much power from the vehicle internal combustion engine, and in particular in order to avoid overcharging the engine with an excessive quantity of feed air. For this purpose, numerous drive devices are known having a transmission ratio which is variable either in a stepless manner or in discrete steps within a range of predetermined values able to maintain the rotational speed of the blower operating shaft at an acceptable value for any rotational speed of the drive shaft. These devices are almost exclusively of mechanical type, and transmit motion either by complicated ratchet mechanisms or, for example, by friction wheels or variable pitch circle diameter (stepless speed-change gears of Beyer type). All variable transmission ratio drive devices of known type are however of high constructional cost, relatively poor reliability, especially when relatively high torques have to be transmitted as are required for driving a positive displacement blower, and are of relatively low mechanical efficiency.

SUMMARY OF THE INVENTION

The object of the present invention is to provide a drive device of variable transmission ratio, particularly suitable for operating an internal combustion engine supercharger, which is of very simple assembly and construction, of low cost, of high reliability and of high mechanical efficiency, said device in particular comprises hydraulic transmission means.

Said object is attained according to the present invention by a drive device of variable transmission ratio, particularly for operating a vehicle engine supercharger, and of the type comprising a driven member and a drive member connected together by hydraulic transmission means, characterised in that said driven member and drive member are respectively connected one to a fluid-tight, rotating casing filled with liquid and the other to a sun gear idly housed inside the casing coaxially therewith and meshing with at least one respective planet gear also idly housed inside the casing, said sun and planet gears defining a gear pump, said casing being provided, in correspondence with the meshing zones of said gears, with respective intake chambers connected hydraulically to at least one inner reservoir of said casing containing said liquid, to respective delivery chambers of relatively small volume, and to respective one-way automatic valves which are preset to open only when a predetermined pressure is attained and which connect said delivery chambers to said inner reservoir of the casing in order, when they are open, to determine a recirculation of said liquid within said casing, with consequent relative rotation of said gears.

BRIEF DESCRIPTION OF THE DRAWINGS

The present invention will be more apparent from the non-limiting description of one embodiment thereof given hereinafter with reference to the accompanying drawings, in which.

DETAILED DESCRIPTION OF THE INVENTION

Figure 1:
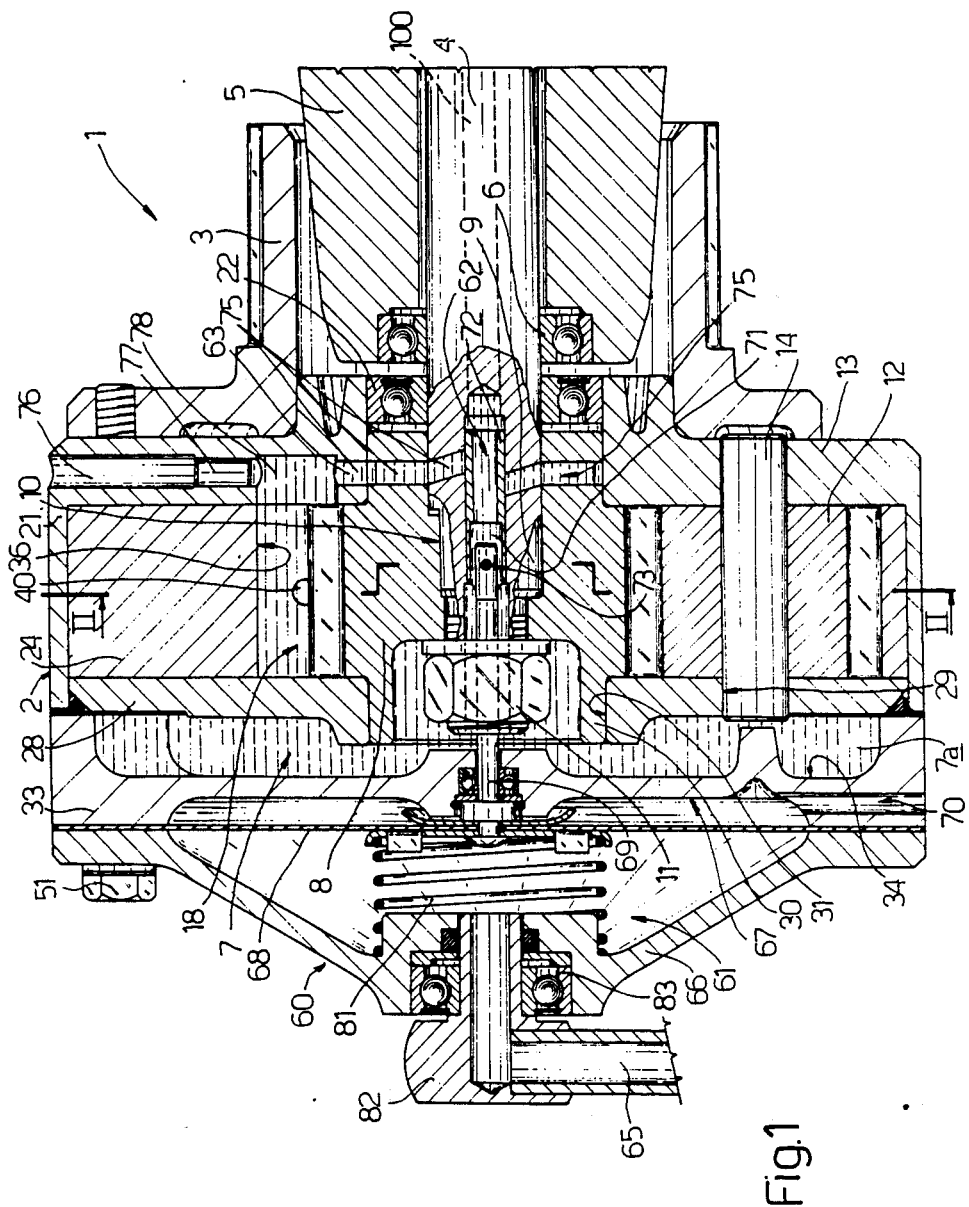
FIG. 1 is a longitudinal section through a drive device of variable transmission ratio constructed in accordance with the present invention.
Figure 2:
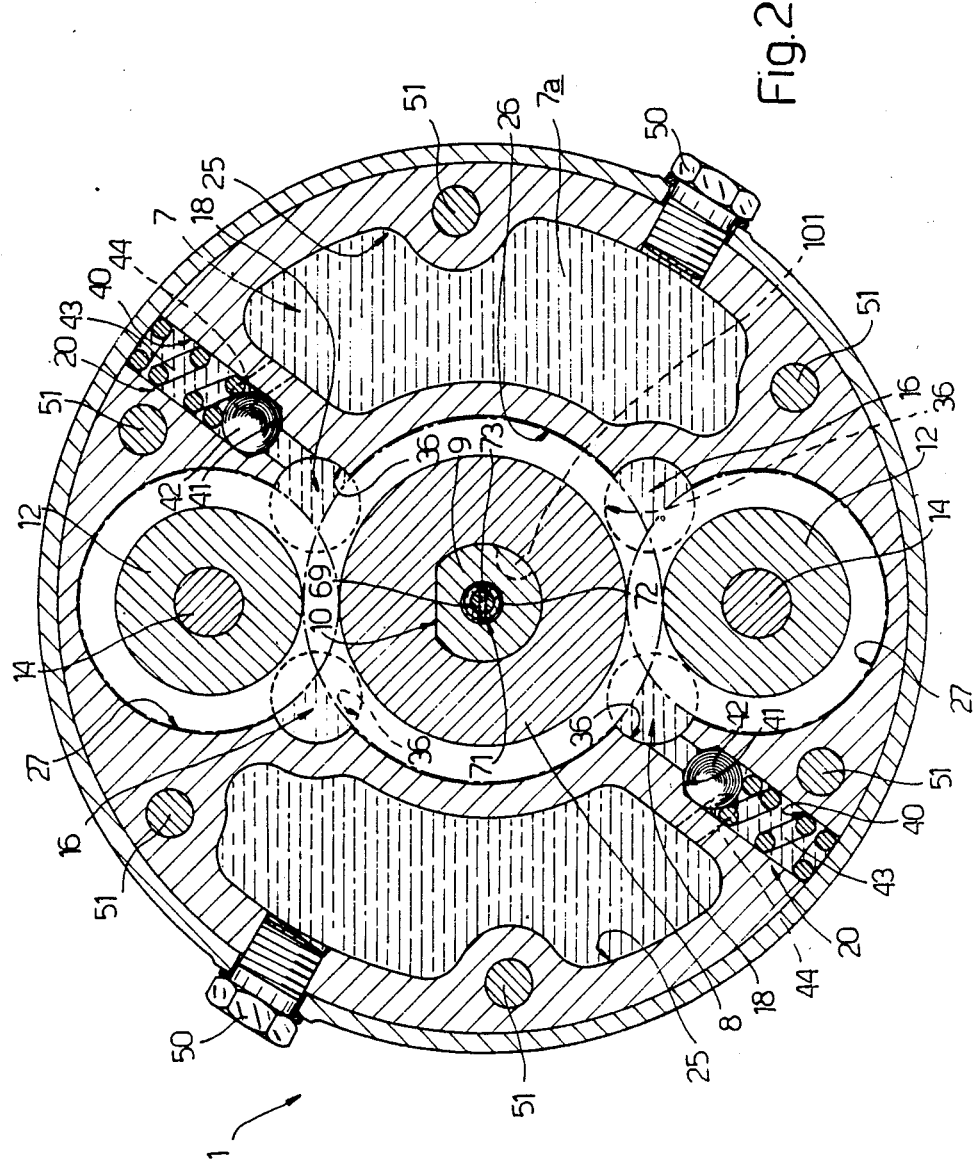
FIG. 2 is a section on the line II—II of the drive device of FIG. 1.

In FIGS. 1 and 2, the reference numeral 1 indicates overall a hydraulically operated drive device of transmission ratio infinitely variable within a range of predetermined values, particularly suitable for use in operating a supercharger, for example a positive displacement blower, of an internal combustion engine of a vehicle of any known type, not shown for simplicity. The device 1 comprises a substantially cylindrical casing 2 provided externally with a ring gear 3 coaxial thereto and angularly rigid therewith, and extending in a cantilever manner therefrom, and a transmission shaft 4 projecting from the casing 2 on the same side as the ring gear 3 and concentric therewith, and arranged to engage a respective support member 5, with respect to which the entire device 1 can be idly carried in a cantilever manner by a suitable bearing 6. The ring gear 3 and the transmission shaft 4 constitute the respective drive member and driven member of the device 1, and are angularly connected together, with an automatically variable transmission ratio, by means of a hydraulic-mechanical device housed inside the casing 2 and described hereinafter. According to the invention, it is indifferent from which of the two members 3 and 4 the device 1 receives its motion, which can therefore be transmitted to the device 1 by way of the ring gear 3 and withdrawn, after possible reduction, by way of the transmission shaft 4, or alternatively be transmitted to the device 1 by way of the shaft 4 and be then withdrawn by way of the ring gear 3. If the device 1 is used for operating an internal combustion engine supercharger, the first alternative is preferred for reasons of space, and reference will be made thereto for simplicity hereinafter.

The casing 2 is provided with suitable gaskets so as to rotate in a fluid-tight manner, and defines internally an inner reservoir 7 filled with a liquid 7a preferably of relatively high density, and constituted according to the invention by lubricating oil. The casing 2 also defines a housing for a sun gear 8, which is mounted idly or journaled inside the casing 2 coaxially therewith, and is fixed angularly rigid to one end 9 of the transmission shaft 4, for example by being partly threaded and provided with a flattened coupling portion 10 and a locking nut 11, or provided with a different type of coupling, for example a conical coupling, and further defines a housing for a pair of planet gears 12 also idly housed inside the casing 2 in an eccentric position symmetrical about its axis of rotation, and meshing with the sun gear 8. In particular, the planet gears 12 are idly carried by an end wall 13 of the casing 2 by means of respective pivots 14 mounted in the casing and disposed parallel to the common axis of rotation of the shaft 4 and casing 2, and are configured in such a manner as to define with the sun gear 8, at their respective meshing zones, a pair of respective gear pumps arranged to circulate the liquid 7a within the casing 2, and similar to the gear pumps of known type widely used in the vehicle field, for example as lubricating oil pumps. In order to enable the sun gear 8 and planet gears 12 to operate as gear pumps, the casing 2 is configured in such a manner as to keep these latter substantially separated from the inner reservoir 7, and to define, at the zones in which the planet gears 12 mesh with the sun gear 8, respective intake chambers 16 connected hydraulically to the reservoir 7, and respective delivery chambers 18 of relatively small volume compared with that of the reservoir 7. According to the invention, the chambers 18 are substantially free from discharge ports and are normally connected to the reservoir 7 only by way of respective automatic pressure relief valves 20 of substantially known type, which are provided within the casing 2 and are preset to open only when a predetermined pressure is reached in the delivery chambers 18, in order, when said pressure is reached, to enable a liquid 7a to flow unidirectionally from these latter to the reservoir 7, from which, when the valves 20 are open, the liquid 7a can be redrawn through the chambers 16 in order to circulate inside the casing 2. This latter, according to the invention, preferably comprises a cup body 21 provided with the end wall 13 and carrying internally the planet gears 12 and externally the ring gear 3, said cup body 21 being idly journaled on the transmission shaft 4 by means of a bearing 22, an annular element 24 inserted substantially without clearance into the cup body 21 and provided with the automatic valves 20, with respective opposing lobular cavities 25 defining part of the reservoir 7, and with respective cylindrical cavities, namely a central cavity 26 and lateral cavities 27, for housing the sun gear 8 and the planet gears 12 respectively, and further comprising a closure disc 28 which seals the cup body 21 substantially in a fluid-tight manner and locks the element 24 therein. The disc 28 is driven into the cup body 21 so as to be carried by the side wall thereof, and besides closing it it also provides a support, at the opposite end to the end wall 13, both for the pivots 14, which engage respective bores 29 therein, and for the sun gear 8, of which a cylindrical projecting end 30 internally housing the nut 11 engages a central bore 31 in the disc 28 formed coaxially to the shaft 4 and to the axis of the casing 2, and acts as a support bearing for this latter. According to the preferred embodiment of the invention, the casing 2 is completed by an internally hollow closure cover 33 of diameter substantially equal to that of the cup body 21, and disposed facing the disc 28 in order to form in its interior, in cooperation with this latter, an interspace 34 which defines the rest of the reservoir 7 and is hydraulically connected to the interior of the lobular cavities 25. For example, the disc 28 can be provided at the cavities 25 with corresponding lobular cavities, not shown for simplicity but having the same shape as the cavities 25, in order to connect these latter to the interspace 34 to form the reservoir 7, and the disc 28 can be provided at the intake chambers 16 with suitable through bores, not shown for simplicity, for connecting these latter to the interspace 34 to thus form the required hydraulic connection between the chamber 16 and said reservoir 7. According to the invention, the chambers 16 and 18 are formed by means of respective axial bores 36 passing through the cylindrical cavities 26 and 27 and formed through the element 24, and the distance between the axes of the cavities 26 and 27 is less than the sum of their radii so that they are interconnected by the intersection of their respective profiles so as to define a single continuous housing cavity for the planet gears 12 and sun gear 8 which allows them to mesh at the chambers 16 and 18. From the description it is apparent that these latter and the cavities 26 and 27 are completely separated from the remaining inner volume of the casing 2 and thus from the reservoir 7, to enable the gears 8 and 12 to operate as a gear pump by drawing the liquid 7a from the chamber 16 and feeding it, compressed, into the chambers 18 as a result of any relative movement of said gears 8 and 12.

According to the invention, the automatic valves 20 each comprise a radial bore 40 formed inside the element 24 so as to open into the corresponding axial bore 36 defining the respective chamber 18, a conical valve seat 41 provided in the radial bore 40, a ball 42 cooperating with the seat 41 and housed mobile in the bore 40, a spiral spring 43 resting at one end against that side wall of the cup body 21 which closes the bores 40 at the opposite end to the chamber 18 and resting at its other end against the ball 42 so as to urge it with predetermined force against the relative valve seat 41, and a respective transverse bore 44 provided downstream of the seat 41 with respect to the ball 42 and connecting the interior of the bore 40 to the reservoir 7. For example, the bore 44 can be provided parallel to the bores 36, pass also through the disc 28 and then open into the interspace 34, or can be transverse to the bores 36 to connect, for example, the bores 40 to the corresponding lobular cavities 25 of the element 24. These latter are preferably provided with respective filling plugs 50 screwed into respective radial bores provided through the elements 21 and 24 to allow the reservoir 7 to be filled with the liquid 7a. The casing 2 described heretofore is finally assembled together by means of a ring of bolts or screws 51, which fix together the ring gear 3, the cup body 21, the element 24, the disc 28 and the cover 33, so as to provide axial retention of the gears 8 and 12 with a certain clearance inside the casing 2, thus enabling them to rotate freely, the shaft 4 being locked by the nut 11 which fixes it in an axially and angularly rigid manner to the sun gear 8.

Finally, according to the invention the device 1 is also provided with a pneumatic control device 60 for effecting the controlled, ie automatic, variation in the transmission ratio between the members 3 and 4, and comprising a pneumatic actuator 61, a shut-off valve 62 controlled by the actuator 61, and at least one duct 63 provided at least partly within the casing 2 in series with the shut-off valve 62, said duct 63 acting as a bypass by connecting the chambers 18 to the reservoir 7 in parallel with the respective valves 20. In particular, said pneumatic control device 60 is mounted on the device 1 only if this is to control the operation of a supercharging positive displacement blower of an internal combustion engine, and is arranged to be operated by the vacuum in the intake manifold of said internal combustion engine, this being transmitted to the pneumatic actuator 61 through a pipe 65. The actuator 61 comprises a cup-shaped cover 66 fixed coaxially on the casing 2 by said bolts or screws 51 and facing an outer cavity 67 in the casing formed in the cover 33, a deformable diaphragm 68 clamped between the cavity 67 of the cover 33 and the cover 66, and a rod 69 mobile axially inside the casing 2 and connected at one end to the diaphragm 68 and at the other end to the shut-off valve 62. In particular, the cavity 67 is connected to atmosphere through a radial bore 70 provided in the cover 33, and the rod 69 is housed axially slidable in the cover 33 coaxial to the axis of rotation of the casing 2, and penetrates into an axial bore 71 coaxial to the sun gear 8 and provided within the end 9 coaxial to the shaft 4, in said bore 71 there being mobile in a fluid-tight manner a sleeve 72 which, together with the bore 71, defines the shut-off valve 62. In this respect, the sleeve 72 is connected to the rod 69 by a transverse pin 73, and the bore 71 passes transversely through the duct 63, which is defined by respective coaxial radial bores 75 provided respectively through the end wall 13 of the cup body 21, the hub of the sun gear 8, and the end 9 of the shaft 4, by utilising a suitable machined radial bore 76 in the cup body 21, which when in use is closed by a plug 77. The bores 75 connect the bore 71 to respective cavities 78 provided in the end wall 13 in positions corresponding with the delivery chambers 18, and the rod 69 is arranged to cause the sleeve 72 to undergo translatory movement in the bore 61 at the duct 63 to an extent such as to open or close, according to the position of the diaphragm 68, communication between the bore 71 and the bores 75. The bore 71 is connected to the reservoir 7, in a manner not shown for simplicity, by way of further radial ducts 75 provided in the casing 2 and shaft 4 and substantially facing the duct 63. Finally, the actuator 61 is also provided with a counteracting spring 81 for the diaphragm 68, and as the actuator is fixed angularly rigid with the casing 2 and is thus rotated therewith, it is connected, when the device 1 is in use, to the pipe 75 by means of a connector 82 journaled idly on the cover 66 by means of a bearing 83.

The operation of the device 1 is described hereinafter with reference to the non-limiting case in which the device is used for operating an internal combustion engine supercharger, it being however understood that the described device 1 can be used for connecting together with variable transmission ratio any two mechanical members or devices of any known type.

When in operation, the ring gear 3 is connected by suitable transmission members to the drive shaft of said internal combustion engine, for example by a gear train or a toothed belt, and the shaft 4 directly operates the supercharger, which for example can be of the Roots blower type. The pipe 65 is connected to the intake duct of the internal combustion engine downstream of the carburettor throttle valve, with reference to the feed air path. If said engine is now started and is under acceleration, it is apparent that as the drive shaft rotates, the ring gear 3 will also be rotated, and this will cause the entire casing 2 and the relative pneumatic control device 60 fixed rigidly thereto by the screws or nuts 51 to consequently rotate on the shaft 4 about the support 5. Under these conditions, the shaft 4 and the relative sun gear 8 are initially held at rest by the resistance due to the load constituted by the positive displacement blower. Thus as the gear assembly 8, 12 is similar to that of an epicyclic reduction gear, but without any internal ring gear or other constraint on the planet gears 12, it is apparent that these latter are rotated together with the casing 2, and that as they mesh with the sun gear 8, they begin to rotate on the pivots 14 and simultaneously rotate about the shaft 4 together with the cup body 21, thus rolling around the sun gear 8 and applying thereto a torque which, in the absence of resistant forces on the shaft 4, would cause it to rotate in the opposite direction to that of the casing 2. However, because of the internal configuration of the casing 2, the movement of the planet gears 12 relative to the sun gear 8 causes immediate intake of liquid 7a (oil) from the intake chambers 16 connected to the inner reservoir 7 and the conveying of the drawn liquid 7a into the delivery chamber 18 by way of the interstices between the mutually meshing teeth of the sun gear 8 and planet gears 12, as happens in a normal gear pump of known type. Under the described internal combustion engine operating conditions (engine under acceleration) it is however clear that the vacuum in the engine intake duct is rather low and therefore the spring 81 prevents any deformation of the diaphragm 68, and keeps the pneumatic actuator 61 in the position shown in FIG. 1, in which it keeps the valve 62 closed. It is also apparent that the springs 43, which according to the invention are preloaded, also keep the automatic valves 20 closed and thus the delivery chambers 18 are completely closed and the liquid 7a fed into them accumulates to cause the pressure in said chambers 18 to progressively increase. It is apparent that the pressure increase in the chambers 18 results in a progressively increasing resistance to the rotation of the planet gears 12, and that when it overcomes the opposing resistance deriving from the load constituted by the blower connected to the shaft 4, it causes the planet gears 12 to become fixed, with consequent rotation of the sun gear 8 together with the shaft 4 in the same direction and at the same speed as the rotational movement to which the casing 2 is subjected. Thus under these conditions there is unitary transmission ratio between the ring gear 3 and the shaft 4, with consequent efficient operation of the positive displacement blower even when said internal combustion engine rotates at low speed, and thus with high power development at said low speed.

As the rotational speed of said internal combustion engine gradually increases, it is apparent that the speed with which the casing 2 is rotated by the ring gear 3 also increases, with consequent increase in the speed of rotation of the shaft 4, this causing the resistant load acting against it to increase. This produces a continuous slight slippage of the sun gear 8 relative to the planet gears 12 which, without altering the unitary transmission ratio between them, simply produces a certain lag between the increase in speed of the ring gear 3 and the increase in speed of the shaft 4, but also producing a continuous pressure increase in the delivery chambers 18. Thus at a certain speed, the pressure in the chambers 18 reaches a value such as to open the automatic valves 20 by overcoming the preloading of the springs 43. Consequently from this moment the pressure in the chambers 18 can no longer increase, and as there is no resistant force exerted by the liquid 7a trapped in the chambers 18, the planet gears 12 are free to again rotate relative to the sun gear 8, thus in practice ceasing to transmit further increases in the rotational speed of the ring gear 3 to the shaft 4, while simultaneously enabling the pressure in the chambers 18 to be kept substantially constant by continuously withdrawing liquid 7a from the chambers 16 and feeding it to the chambers 18 from which the liquid emerges through the valves 20 for recirculation through the reservoir 7. From the description it is therefore apparent that on opening the valves 20, the transmission shaft 4 continues to rotate at constant speed with no further acceleration, whereas the ring gear 3 and casing 2 can continue to rotate freely at the rotational speed imposed by the rotation of the drive shaft of said internal combustion engine, thus providing a transmission ratio between the ring gear 3 and shaft 4 which progressively decreases as the rotational speed of the ring gear 3 increases. In contrast, during the deceleration stage, the casing 2 progressively reduces in speed, with consequent reduction in the rotational speed of the planet gears 12, to thus cause the pressure in the chambers 18 to fall until the valves 20 reclose. Consequently at this point the shaft 4 should again become linked to the ring gear 3 under unitary transmission ratio, however because of the fact that during deceleration or during operation under partial loads it is not necessary to supercharge the engine, the device 1 is able to disconnect the shaft 4 from the ring gear 3 by means of the automatic control device in the form of the actuator 61. In this respect, because of the deceleration, the vacuum in the intake duct suddenly increases to deform the diaphragm 68 which, overcoming the resistance of the spring 81, causes the rod 69 to move towards the connector 82, thus causing the sleeve 72 to slide until the duct 63 is connected to the bores 75 by way of the bore 71. Under these conditions, it is apparent that even when the valves 20 are closed, the liquid 7a is free to recirculate within the casing 2 by being able to be discharged from the delivery chambers 18 through the duct 63 and bores 75 and returned to the reservoir 7 from which it can again be drawn through the intake chambers 16. Under such conditions, the plant gears 12 do not encounter any resistance to rotation, and consequently rotate idly on the pivots 14 around the sun gear 8 without transmitting any torque to this latter. Consequently, the casing 2 continues to rotate together with the ring gear 3, whereas the shaft 4 under the effect of the load supplied to it, is able to stop or at least strongly decelerate to prevent wasteful torque absorption by the supercharger. When deceleration ceases, the vacuum in the duct 65 reduces and thus the spring 81 returns the diaphragm 68 towards the cavity 67 to close the valve 62 and thus allow the pressure in the chambers 18 to again increase until, as described heretofore, the shaft 4 is again rotated together with the ring gear 3 at unitary transmission ratio.

The advantages of the drive device of the present invention are apparent from the description, and it is also apparent that modifications can be made thereto without leaving the scope of the inventive idea. In particular, if high power has to be transmitted it is possible to circulate the oil or liquid contained in the casing 2 outside the casing itself, so as to prevent overheating. For example (FIGS. 1 and 2), the bore 75 in the shaft 4 could be dispensed with, and the oil fed from the sump through a bore 100 (indicated by dashed lines in FIG. 1), and then discharged through a channel 101 (indicated by a dashed line in FIG. 2) provided in the surface of the shaft 4.

I claim:

1. A drive device of variable transmission ratio, particularly for operating a vehicle engine supercharger, said drive device comprising:
   a drive member and a drive member connected together by hydraulic transmission means;
   a fluidtight rotating casing filled with liquid and housing in a freely rotatable manner a sun gear coaxially journaled within said casing by first bearing means and at least one planet gear meshed with said sun gear and idly journaled eccentrically to the axis of said casing by second bearing means;
   said driven and drive members being respectively connected one to said casing and one to said sun gear and the latter and said planet gear defining a gear pump;
   said casing being provided, in correspondence with the meshing zones of said gears, with an intake chamber connected hydraulically to at least one inner reservoir of said casing containing said liquid, to a delivery chamber of relatively small volume, and to a one-way automatic valve which is preset to open only when a predetermined pressure is attained and which connects said delivery chamber to said inner reservoir of the casing in order, when open, to establish a recirculation of said liquid within said casing, with consequent relative rotation of said gears;
   a pneumatic device for controlling the variation in the transmission ratio, comprising a pneumatic actuator, at least one shut-off valve controlled by said pneumatic actuator, and at least one duct formed at least partly within said casing and provided in series with said shut-off valve, said duct connecting said delivery chamber to said inner reservoir of the casing, in the manner of a bypass in parallel with the automatic one-way valve; and
   said pneumatic actuator comprising a cup-shaped cover fixed coaxially on said casing and facing an outer cavity provided in the latter and connected to atmosphere by a bore, a diaphragm clamped between said outer cavity of the casing and said cover, and a rod movable axially in the casing and connected at one end to said diaphragm and at the other end to said shutoff valve.

2. A device as claimed in claim 1, wherein said actuator is arranged for control by a vacuum in an intake manifold of an internal combustion engine.

3. A device as claimed in claim 1, wherein said duct and said shut-off valve are disposed at least partly within said sun gear, this latter valve comprising a bore coaxial to the sun gear and traversing said duct, and a sleeve connected to said rod and movable in said bore.

4. A device as claimed in claim 1, wherein said automatic one-way valve comprises a radial bore provided within the casing and opening into the delivery chamber, a conical valve seat provided in said radial bore, a ball cooperating with the conical valve seat and housed movable in said radial bore, a preloaded spring housed in said radial bore and urging said ball against said conical seat with a predetermined force, and a transverse bore provided downstream of the valve seat with reference to the ball, and connecting said radial bore to said inner reservoir.

5. A device as claimed in claim 1, wherein said casing is substantially cylindrical and is provided externally with a ring gear, and wherein inside the casing there are housed, in an eccentric position symmetrical about the axis thereof, a pair of planet gears journaled by an end wall of the casing by means of respective pivots on which said planet gears are rotatable, and a sun gear coaxial to the casing and meshing with both the planet gears and carried angularly rigid by a transmission shaft which journals said casing in a cantilevered manner and projects therefrom on the same side as said ring gear, said transmission shaft being journaled in a support member.

6. A device as claimed in claim 5, wherein said casing comprises:

a cup body journaling said planet gears and rotatable relative to said transmission shaft and relative to the sun gear;

an annular element inserted substantially without clearance into the cup body and provided with two of said automatic valves, with respective opposing lobular cavities defining at least part of said inner reservoir and comprising respective filling plugs, with interconnected cylindrical cavities defining a continuous housing for said planet gears and said sun gear, and with respective axial bores traversing the cylindrical cavities and defining two each of said intake and delivery chambers;

a closure disc for said cup body; and a closure cover facing said disc and defining therewith the rest of said inner reservoir.

* * * * *